(12) United States Patent
Sugama et al.

(10) Patent No.: US 6,442,136 B1
(45) Date of Patent: *Aug. 27, 2002

(54) TRAFFIC SHAPING DEVICE FOR ATM COMMUNICATION NETWORK

(75) Inventors: Koichi Sugama; Ryuji Kayama; Yoshihiro Onoda; Yukio Katayanagi; Toshikazu Yamakawa, all of Yokohama (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/226,310

(22) Filed: Jan. 7, 1999

(30) Foreign Application Priority Data

Jul. 15, 1998 (JP) .......................................... 10-200049

(51) Int. Cl.⁷ ............................................... G01R 31/08
(52) U.S. Cl. ........................ 370/230; 370/235; 370/395
(58) Field of Search .............................. 370/230, 230.1, 370/232, 395, 395.2, 395.21, 395.4, 395.42, 395.43, 235

(56) References Cited

U.S. PATENT DOCUMENTS 5,719,865 A  *  2/1998  Sato ........................... 370/395
5,864,540 A  *  1/1999  Bonomi et al. ............. 370/235
5,978,356 A  * 11/1999  Elwalid et al. ............. 370/230

FOREIGN PATENT DOCUMENTS

| JP | 03136432 A | 6/1991 |
|----|-----------|--------|
| JP | 5-219068 A | 8/1993 |
| JP | 5-268181   | 10/1993 |
| JP | 5-284173 A | 10/1993 |
| JP | 06181470 A | 6/1994 |
| JP | 07099494 A | 4/1995 |
| JP | 08107421 A | 4/1996 |
| JP | 10004414 A | 1/1998 |
| JP | 10098473 A | 4/1998 |

* cited by examiner

Primary Examiner—Ricky Ngo
(74) Attorney, Agent, or Firm—Katten Muchin Zavis Rosenman

(57) ABSTRACT

A traffic shaping control device for an ATM communication network which permits downscaling of hardware and eliminates a delay of cells that is caused by performing a delay process on cells which need not be subjected to the delay process. The flow rate of cells of each of connections is checked with the use of flow rate calculating unit, and a cell exceeding a predetermined reference flow rate is circulated through a delay loop, which is constituted by delay-controlled cell detecting unit, delay-passed cell detecting unit, number-of-repetitions monitoring unit and delay unit, a number of times corresponding to an initial number of repetitions determined for each connection. Such a cell is therefore delayed so that the flow rate may eventually become lower than or equal to the predetermined reference flow rate. The cell flow rate is thereafter again checked by the flow rate calculating unit, and the above operation is repeated until the flow rate is reduced to the predetermined reference flow rate or below.

8 Claims, 10 Drawing Sheets

| VPI/VCI VALUES | A VALUE | B VALUE | C VALUE | FLOW RATE CALCULATION PARAMETER VALUE |
|---|---|---|---|---|
| | | | | |
| | | | | |
| | ... | ... | ... | ... |

FIG. 5

TRAFFIC SHAPING DEVICE FOR ATM COMMUNICATION NETWORK

BACKGROUND OF THE INVENTION (1) Field of the Invention

The present invention relates to a traffic shaping control device for an ATM (Asynchronous Transfer Mode) communication network, and more particularly, to a traffic shaping control device used in an ATM communication network for keeping the time interval between adjacent ATM cells of each of connections at a prescribed value or more.

(2) Description of the Related Art

FIG. 10 shows the configuration of a conventional traffic shaping control device. As a cell sorting section 200 successively receives a plurality of ATM cells of different connections, that is, ATM cells with different VPI (Virtual Path Identifier)/VCI (Virtual Channel Identifier) values, it distributes the cells to respective different cell memories 210 to 212 according to VPI/VCI values. Each of the cell memories 210 to 212 stores cells distributed thereto and, in response to a read signal supplied from a read timing generating section 220, reads out the cells stored therein and outputs same to a cell flow creating section 230. The read timing generating section 220 has a cell output time interval set for each VPI/VCI value and supplies the read signal to each of the cell memories 210 to 212 at corresponding intervals of time. The cell output time interval is set in accordance with the data transmission rate prescribed by an agreement previously made between a subscriber and the carrier.

The cell flow creating section 230 creates a single cell flow from the cells supplied thereto from the individual cell memories 210 to 212. Specifically, individual cells are carried by a sequence of time slots constituting a single signal and are sent out onto a line.

Thus, restrictions are placed on cells which are transmitted from a subscriber at a rate higher than that prescribed by the agreement.

The conventional device, however, requires cell memories equal in number to the connections, giving rise to a problem that large-scale hardware is needed.

Also, the conventional device is constructed such that every cell is once stored in the cell memory. Accordingly, even those cells which are transmitted in conformity with the subscription agreement are unavoidably delayed at the cell memory, and thus there is a demand for a means of eliminating such a delay of cells.

SUMMARY OF THE INVENTION

An object of the present invention is to provide a traffic shaping device for an ATM communication network which permits downscaling of the hardware and can eliminate a delay of cells that is caused by performing a delay process on cells which need not be subjected to the delay process.

To achieve the above object, there is provided a traffic shaping control device used in an ATM communication network for keeping a time interval between adjacent ATM cells of each of connections at a prescribed value or more. The traffic shaping control device for an ATM communication network comprises repetition number affixing means for affixing a repetition number of "0" to an input cell, delay-controlled cell detecting means for determining based on a VPI/VCI value of the input cell or a delayed cell whether or not the cell concerned is a first type cell which, inclusive of another cell of an identical connection, is not currently present in a delay loop, delay-passed cell detecting means for determining, based on the VPI/VCI value of the input cell or the delayed cell and the repetition number affixed thereto, whether the cell concerned is a second type cell which has passed through the delay loop with another cell of an identical connection currently present in the delay loop, or a third type cell which has not yet passed through the delay loop but with another cell of an identical connection currently present in the delay loop, and for outputting the third type cell with an initial number of repetitions set as the repetition number affixed thereto, number-of-repetitions monitoring means for receiving the second type cell from the delay-passed cell detecting means, checking the repetition number affixed to the received cell to determine whether or not the cell has passed through the delay loop a number of times corresponding to the initial number of repetitions thereof, and for outputting the cell with the repetition number thereof decremented by "1" if the cell has not yet passed through the delay loop a number of times corresponding to the initial number of repetitions thereof, flow rate calculating means for receiving the first type cell from the delay-controlled cell detecting means and a cell which, among second type cells, has passed through the delay loop a number of times corresponding to the initial number of repetitions thereof, from the number-of-repetitions monitoring means, calculating a flow rate of the received cell to determine whether or not a predetermined reference flow rate is exceeded by the calculated flow rate, and for outputting a cell of which the calculated flow rate is higher than the predetermined reference flow rate with the initial number of repetitions set as the repetition number affixed thereto, repetition number deleting means for deleting the repetition number from a cell of which the calculated flow rate is judged to be not exceeding the predetermined reference flow rate by the flow rate calculating means, and delay means for subjecting the third type cell output from the delay-passed cell detecting means, the second type cell which is output from the number-of-repetitions monitoring means and of which the repetition number has been decremented, and the first or second type cell which is output from the flow rate calculating means and of which the repetition number has been decremented, to a delay process for a predetermined time and outputting the delayed cell.

The above and other objects, features and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram showing the arrangement of a storage area in a control memory;

DESCRIPTION OF THE PREFERRED EMBODIMENTS

An embodiment of the present invention will be hereinafter described with reference to the drawings.

Figure 1:
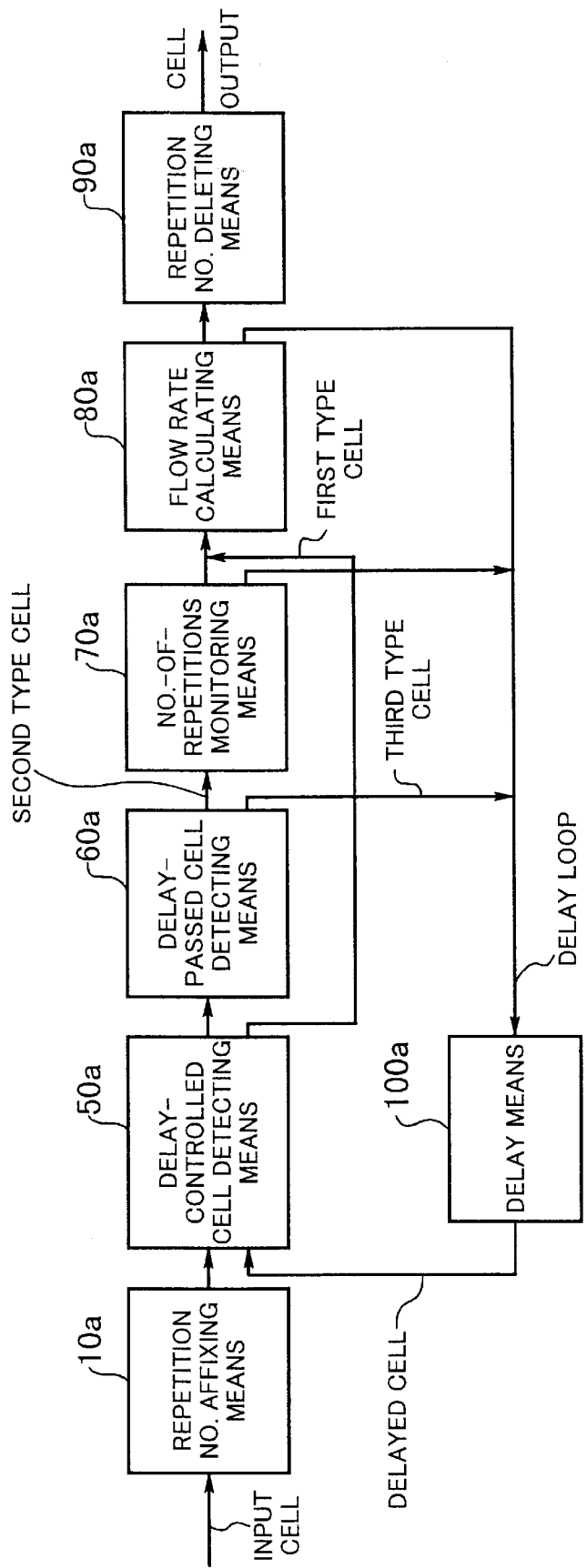
FIG. 1 is a diagram illustrating the principles of the present invention.

Referring first to FIG. 1, a theoretical configuration according to the embodiment of the present invention will be described. The embodiment of the present invention comprises repetition number affixing means 10a for affixing a repetition number of "0" to an input cell, delay-controlled cell detecting means 50a for determining based on a VPI/VCI value of the input cell or a delayed cell whether or not the cell concerned is a first type cell which, inclusive of another cell of an identical connection, is not currently present in a delay loop, delay-passed cell detecting means 60a for determining, based on the VPI/VCI value of the input cell or the delayed cell and the repetition number affixed thereto, whether the cell concerned is a second type cell which has passed through the delay loop with another cell of an identical connection currently present in the delay loop, or a third type cell which has not yet passed through the delay loop but with another cell of an identical connection currently present in the delay loop, and for outputting the third type cell with an initial number of repetitions set as the repetition number affixed thereto, number-of-repetitions monitoring means 70a for receiving the second type cell from the delay-passed cell detecting means 60a, checking the repetition number affixed to the received cell to determine whether or not the cell has passed through the delay loop a number of times corresponding to the initial number of repetitions thereof, and for outputting the cell with the repetition number thereof decremented by "1" if the cell has not yet passed through the delay loop a number of times corresponding to the initial number of repetitions thereof, flow rate calculating means 80a for receiving the first type cell from the delay-controlled cell detecting means 50a and a cell which, among second type cells, has passed through the delay loop a number of times corresponding to the initial number of repetitions thereof, from the number-of-repetitions monitoring means 70a, calculating a flow rate of the received cell to determine whether or not a predetermined reference flow rate is exceeded by the calculated flow rate, and for outputting a cell of which the calculated flow rate is higher than the predetermined reference flow rate with the initial number of repetitions set as the repetition number affixed thereto, repetition number deleting means 90a for deleting the repetition number from a cell of which the calculated flow rate is judged to be not exceeding the predetermined reference flow rate by the flow rate calculating means 80a, and delay means 100a for subjecting the third type cell output from the delay-passed cell detecting means 60a, the second type cell which is output from the number-of-repetitions monitoring means 70a and of which the repetition number has been decremented, and the first or second type cell which is output from the flow rate calculating means 80a and of which the repetition number has been decremented, to a delay process for a predetermined time and outputting the delayed cell.

In the configuration described above, usually the flow rate of cells of each of connections is checked by means of the flow rate calculating means 80a which is used for cell policing (monitoring), and a cell exceeding the predetermined reference flow rate is caused to circulate through the delay loop constituted by the delay-controlled cell detecting means 50a, the delay-passed cell detecting means 60a, the number-of-repetitions monitoring means 70a and the delay means 100a, a number of times corresponding to the initial number of repetitions determined for each connection. Consequently, the cell in question is delayed so that the flow rate may be limited to the predetermined reference flow rate or below. Controlling the flow rate in this case means controlling the interval between cells. The flow rate calculating means 80a thereafter again checks the cell flow rate and the above operation is repeated until the flow rate becomes lower than or equal to the predetermined reference flow rate.

As seen from the configuration shown in FIG. 1, the present invention makes it unnecessary to provide a cell memory for each of connections. Also, those cells with no problem of cell flow rate are not subjected to the delay process, and thus the present invention can eliminate a delay of cells that occurs in the conventional device due to a delay process performed on cells which need not be subjected to the delay process.

The embodiment of the present invention will be now described in more detail. In the following description of the embodiment, the repetition number affixing means 10a shown in FIG. 1 corresponds to a repetition number affixing section 10 in FIG. 2. Similarly, the delay-controlled cell detecting means 50a corresponds to a delay-controlled cell detecting section 50, the delay-passed cell detecting means 60a corresponds to a delay-passed cell detecting section 60 and an initial number-of-repetitions affixing section 61, the number-of-repetitions monitoring means 70a corresponds to a number-of-repetitions monitoring section 70 and a repetition number subtracting section 71, the flow rate calculating means 80a corresponds to a flow rate calculating section 80 and an initial number-of-repetitions affixing section 81, the repetition number deleting means 90a corresponds to a repetition number deleting section 90, and the delay means 100a corresponds to a delay section 100.

Figure 2:
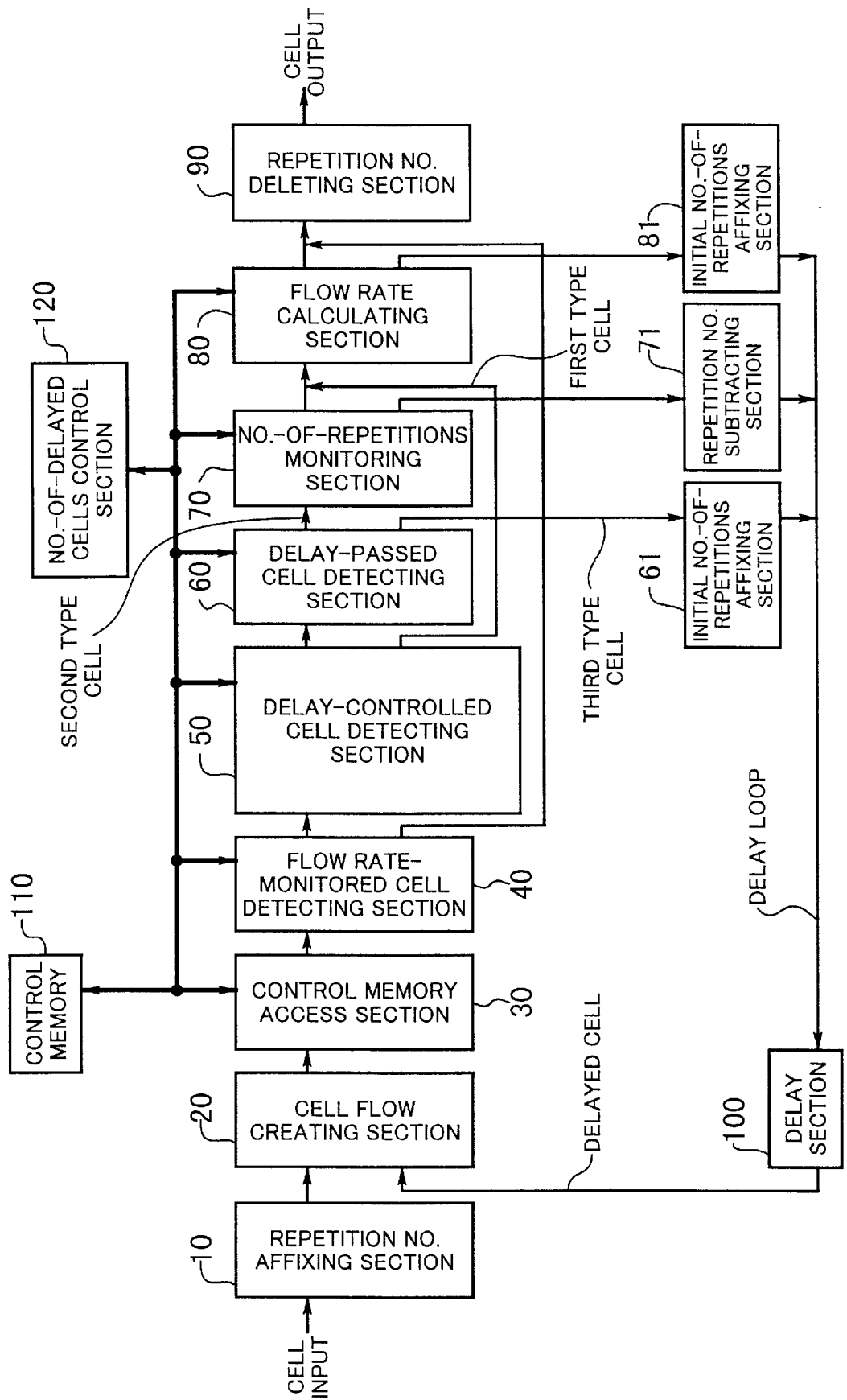
FIG. 2 is a block diagram showing the configuration of a traffic shaping device according to the present invention.

FIG. 2 shows the configuration of a traffic shaping device according to the present invention.

To the repetition number affixing section 10 are successively input ATM cells sent from different connections. The repetition number affixing section 10 affixes a repetition number K to each of the input cells. Specifically, the HEC byte of an ATM cell is used to hold the repetition number K, or one byte for the repetition number K is added to a 53-byte ATM cell. In the repetition number affixing section 10, the value "0" is set as the repetition number K. The repetition number K thus set remains affixed to the cell while the cell is circulated through the delay loop, until it is deleted at the repetition number deleting section 90, described later.

A cell flow creating section 20 receives input cells from the repetition number affixing section 10 and delayed cells from the delay section 100, described later, and creates a cell flow, which is then supplied to a control memory access section 30. The cell flow is a signal created by allowing input cells or delayed cell to be successively carried by time slots. The internal arrangement of the cell flow creating section 20 will be described later with reference to FIGS. 8 and 9.

The control memory access section 30 successively extracts cells from the cell flow and, based on a VPI/VCI value retained by each of the extracted cells, makes reference to a control memory 110.

FIG. 5 illustrates the arrangement of a storage area in the control memory 110. Specifically, with respect to each VPI/VCI value, an A value, a B value, a C value and a flow rate calculation parameter value are stored. The A value is data indicating whether or not the cell sent from a connection corresponding to the VPI/VCI value concerned is a cell of which the flow rate is to be monitored, and is externally set beforehand. The B value is data indicative of the number of cells which are present in the delay loop, among a plurality of cells sent from a connection corresponding to the VPI/VCI value concerned, and is set by a number-of-delayed cells control section 120, described later. The C value indicates an initial number of repetitions externally set beforehand for each of connections. The flow rate calculation parameter value is a parameter value necessary for the flow rate calculating section 80, described later, in calculating the flow rate and making a flow rate-related determination, and is externally set beforehand for each of connections. The flow rate calculation parameter value also includes a predetermined reference flow rate. The A value is represented, for example, by 2 bits, the B and C values are each represented by 3 bits, the flow rate calculation parameter value is represented by 8 bits, and the VPI/VCI value is represented by 9 bits (VPI: 1 bit; VCI: 8 bits).

The control memory access section 30 reads, from the control memory 110, the A value, B value, C value and flow rate calculation parameter value corresponding to the VPI/VCI value retained by the extracted cell, sends the A value to a flow rate-monitored cell detecting section 40, sends the B value to the delay-controlled cell detecting section 50, sends the C value to the initial number-of-repetitions affixing section 61 via the delay-passed cell detecting section 60 as well as to the initial number-of-repetitions affixing section 81 via the flow rate calculating section 80, and sends the flow rate calculation parameter value to the flow rate calculating section 80. The control memory access section 30 sends the cells supplied thereto from the cell flow creating section 20 to the flow rate-monitored cell detecting section 40.

The flow rate-monitored cell detecting section 40 determines based on the A value whether or not the corresponding cell supplied thereto is a cell of which the flow rate is to be monitored. Cells of which the flow rate need not be monitored are sent to the repetition number deleting section 90, and cells of which the flow rate is to be monitored are sent to the delay-controlled cell detecting section 50.

The repetition number deleting section 90 deletes the repetition number K affixed to the cell to restore the cell to its original state, and outputs the cell.

The delay-controlled cell detecting section 50 determines whether or not the B value associated with each of the cells supplied thereto equals "0", and if the B value equals "0", the corresponding cell is sent to the flow rate calculating section 80 as a first type cell. If the B value is not equal to "0", the corresponding cell is sent to the delay-passed cell detecting section 60. Namely, if there are no cells from an identical connection, inclusive of the cell in question, currently present in the delay loop (B value=0), the cell is sent to the flow rate calculating section 80 for a flow rate check.

The delay-passed cell detecting section 60 determines whether or not the repetition number K affixed to each of the cells supplied thereto equals "0", and if the repetition number K equals "0", the corresponding cell is sent to the initial number-of-repetitions affixing section 61 as a third type cell. If the repetition number K is not equal to "0", the corresponding cell is sent to the number-of-repetitions monitoring section 70 as a second type cell. Namely, the cell whose B value is not "0" and whose repetition number K is "0" is a cell which has newly been input from a certain connection but other cell(s) from the same connection is(are) currently under the delay process. For such a cell, the initial number-of-repetitions affixing section 61 sets an initial number of repetitions (C value) in the cell as the repetition number K affixed thereto, and the cell is sent to the delay section 100 to be delayed for a predetermined time Td.

The second type cell whose B value is not "0" and whose repetition number K is not "0" is a cell which has been sent from the delay loop and thus delayed. The number-of-repetitions monitoring section 70 determines whether or not the repetition number K equals "1", and if the repetition number K equals "1", the monitoring section 70 judges that the corresponding cell has circulated through the delay loop a number of times corresponding to the initial number of repetitions thereof, and therefore, sends the cell to the flow rate calculating section 80. If the repetition number K has not yet decreased to "1", the corresponding cell is sent to the repetition number subtracting section 71 in which the repetition number K is decremented by "1", and the cell is then sent to the delay section 100 to be delayed for the predetermined time Td.

Thus, in cases where a plurality of cells of an identical connection coexist in the delay loop, the repetition number K serves to prevent a cell input at a later time from being sent to the flow rate calculating section 80 earlier than a previously input cell is.

The flow rate calculating section 80 obtains a flow rate of the cells supplied thereto with respect to each of connections, and determines whether or not the predetermined reference flow rate is exceeded by the obtained flow rate. A cell exceeding the predetermined reference flow rate is judged to be unconformable to the subscriber agreement. In practice, the time interval between the cell in question and an immediately preceding cell is obtained by a conventional flow rate calculation method, and it is determined whether or not the obtained cell interval is smaller than a predetermined reference interval value. A cell with an interval smaller than the predetermined reference interval value is judged to be in unconformity.

A cell which has been judged to be in unconformity is sent to the initial number-of-repetitions affixing section 81 in which the initial number of repetitions (C value) is substituted for the repetition number K affixed to the cell, whereby the cell is again circulated through the delay loop a number of times corresponding to the initial number of repetitions.

The same process as above is also performed on the first type cell in the flow rate calculating section 80.

When a cell enters the delay loop for the first time, the number-of-delayed cells control section 120 increments the B value of the corresponding connection in the control memory 110 by "1", and when the cell leaves the delay loop, the control section 120 decrements the B value by "1".

The delay section 100 will be described later with reference to FIGS. 6 and 7.

Figure 3:
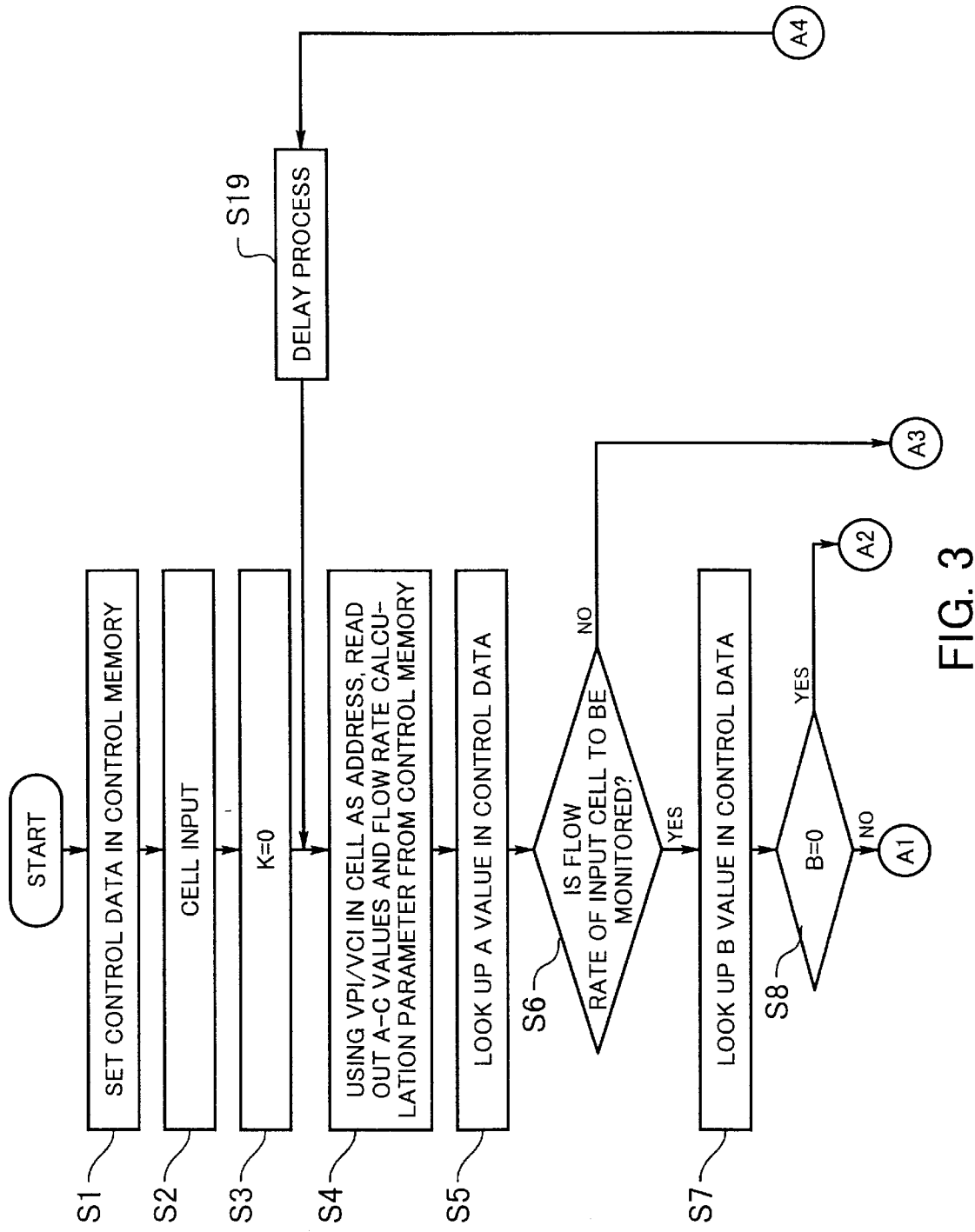
FIG. 3 is the first half of a flowchart illustrating the operation of the traffic shaping device.
Figure 4:
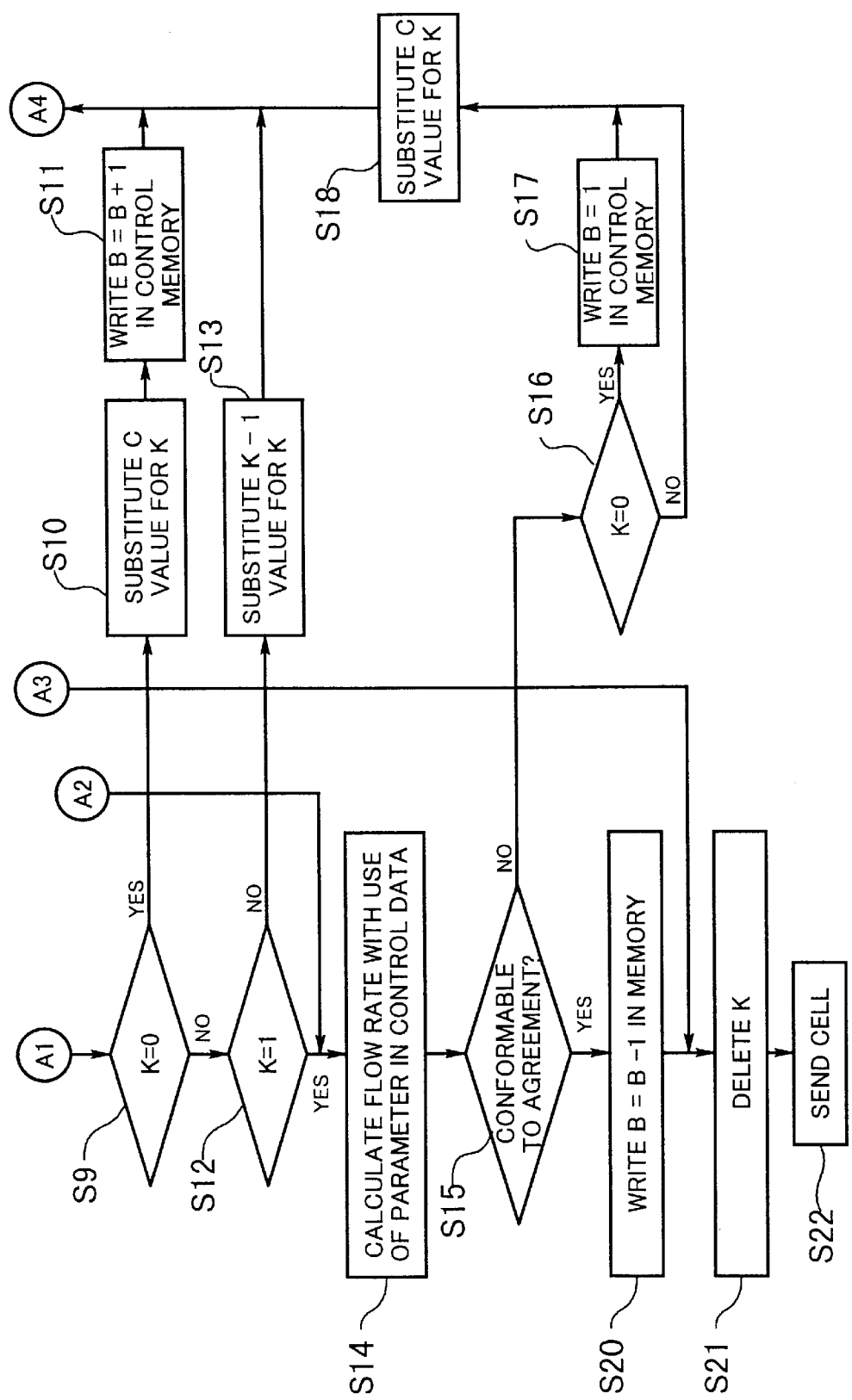
FIG. 4 is the latter half of the flowchart illustrating the operation of the traffic shaping device.

FIGS. 3 and 4 are the first and second halves, respectively, of a flowchart illustrating the operation of the traffic shaping device described above. Referring to the flowchart, the process/operation of the traffic shaping device will be described.

First, with respect to each VPI/VCI, the A value, the C value and the flow rate calculation parameter value are set in advance in the control memory 110, and the B value is set to "0" at the time of initialization (S1).

When a cell is input, the repetition number affixing section 10 affixes the repetition number K to the input cell, thereby setting the value of the repetition number to "0" (S2, S3).

The control memory access section 30 extracts the VPI/VCI value from the input cell, and based on the VPI/VCI value thus extracted, refers to the control memory 110 to read out the A value, B value, C value and flow rate calculation parameter value corresponding to the extracted VPI/VCI value (S4).

Based on the A value, the flow rate-monitored cell detecting section 40 determines whether or not the input cell is a cell of which the flow rate is to be monitored; if the input cell is a cell of which the flow rate is to be monitored, the flow proceeds to Step S7, and if not, the flow proceeds to Step S21 (S5, S6).

Based on the B value, the delay-controlled cell detecting section 50 determines whether the B value equals "0" or not. If the B value equals "0", the flow proceeds to Step S14, and if the B value is "1" or more, the flow proceeds to Step S9 (S7, S8).

The delay-passed cell detecting section 60 looks up the repetition number K affixed to the cell to determine whether or not the repetition number K equals "0". If K=0, the flow proceeds to Step S10, and if K is "1" or more, the flow proceeds to Step S12 (S9).

The initial number-of-repetitions affixing section 61 sets the C value (initial number of repetitions) of the corresponding connection, read from the control memory 110, as the repetition number K affixed to the cell (S10).

The number-of-delayed cells control section 120 increments the B value of the corresponding connection in the control memory 110 by "1" (S11).

The number-of-repetitions monitoring section 70 looks up the repetition number K affixed to the cell to determine whether or not the repetition number K equals "1". If K=1, the flow proceeds to Step S14, and if K is "2" or more, the flow proceeds to Step S13 (S12).

The repetition number subtracting section 71 decrements the repetition number K affixed to the cell by "1" (S13).

Using the flow rate calculation parameter value, the flow rate calculating section 80 calculates the flow rate of the corresponding cell supplied thereto, and determines whether or not the flow rate is conformable to the subscriber agreement. If the calculated flow rate is conformable to the agreement, the flow proceeds to Step S20, and if not, the flow proceeds to Step S16 (S14, S15).

The number-of-delayed cells control section 120 determines whether or not the repetition number K of the cell supplied thereto equals "0" (S16). In this case, B value=0 holds for a cell with a repetition number K of "0", and such a cell is a cell which enters the delay loop for the first time with no other cells of the same connection present in the delay loop. Accordingly, the number-of-delayed cells control section 120 sets the B value of the corresponding connection in the control memory 110 to "1" (S17). If the repetition number K of the cell supplied thereto is "1" or more, then the cell has already been circulated through the delay loop, and therefore, the B value is left unchanged.

The initial number-of-repetitions affixing section 81 sets the C value (initial number of repetitions) of the corresponding connection, read from the control memory 110, as the repetition number K affixed to the cell (S18).

The delay section 100 subjects the cells output from the initial number-of-repetitions affixing sections 61 and 81 and the repetition number subtracting section 71 to a delay process for the predetermined time Td (S19).

The number-of-delayed cells control section 120 decrements the B value of the connection in the control memory 110, which corresponds to the cell conformable to the subscriber agreement, by "1" (S20).

The repetition number deleting section 90 deletes the repetition number K affixed to the cell and then sends out the cell (S21, S22).

Thus, a cell conformable to the subscriber agreement is not subjected to the delay process from the outset, but a cell unconformable to the subscriber agreement is caused to circulate through the delay loop a number of times corresponding to the initial number of repetitions so as to be delayed for a time period corresponding to (predetermined time Td delayed at the delay section 100×initial number of repetitions). If, as a result of the delay process, a delayed cell is judged to be conformable to the subscriber agreement by the flow rate calculating section 80, it is output from the traffic shaping device; on the other hand, a delayed cell which is judged to be still not conformable to the subscriber agreement by the flow rate calculating section 80 is again made to enter the delay loop.

Figure 6:
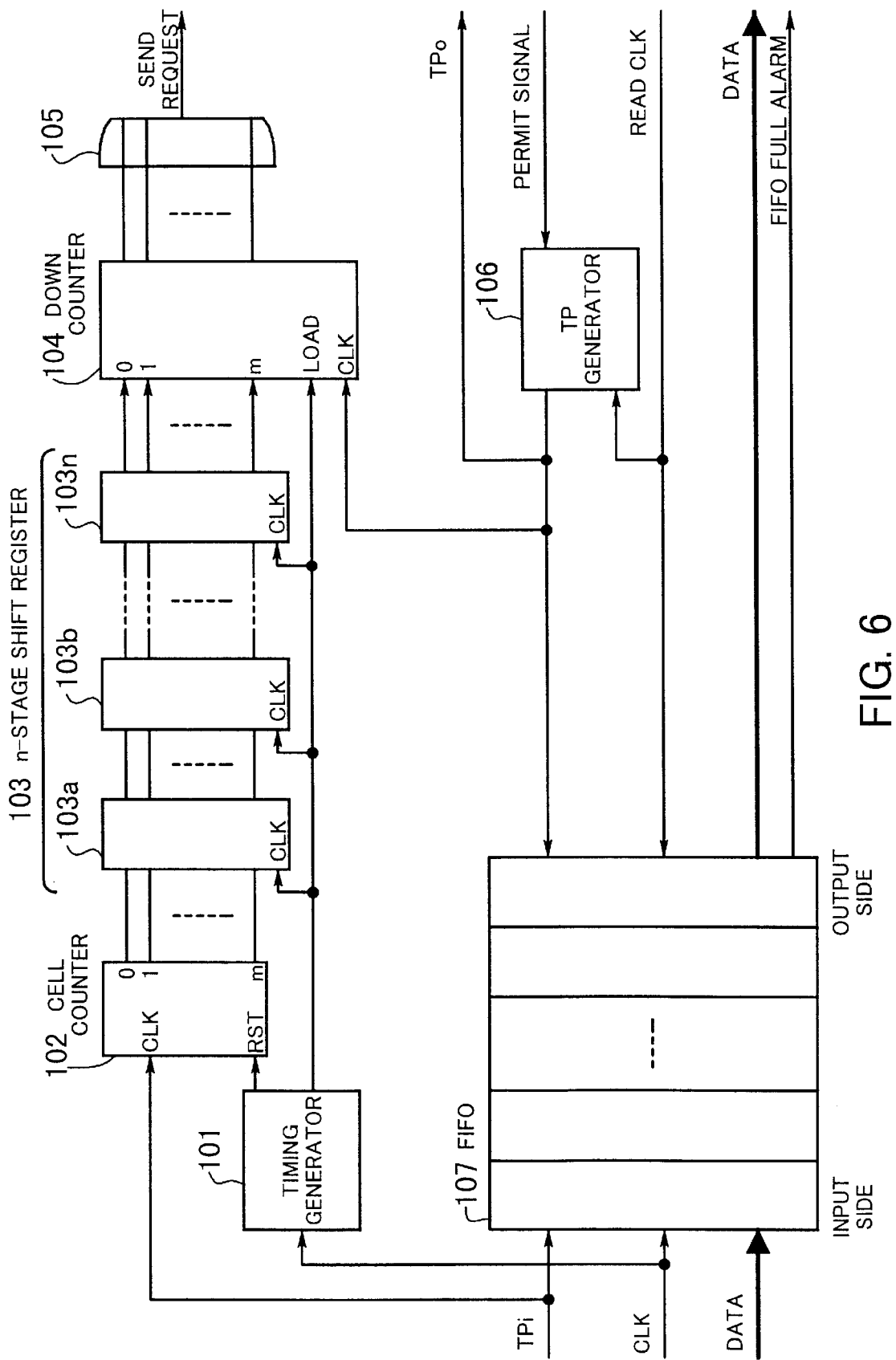
FIG. 6 is a block diagram showing the internal arrangement of a delay section.
Figure 7:
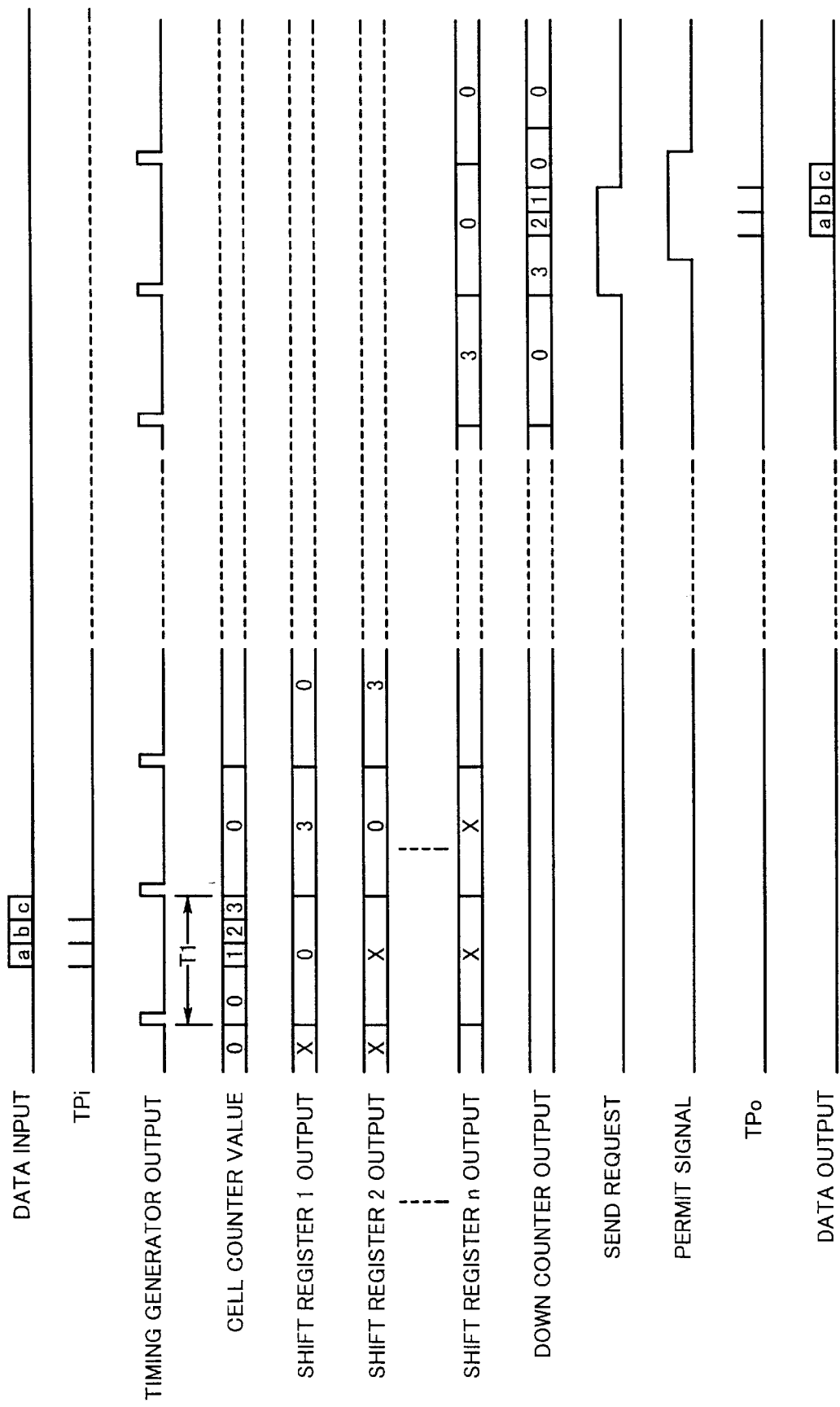
FIG. 7 is a timing chart showing operation timings of individual parts of the delay section.

FIG. 6 shows the internal arrangement of the delay section 100, and FIG. 7 shows the operation timings of individual parts of the delay section 100.

The delay section 100 comprises a timing generator 101, a cell counter 102, an n-stage shift register 103, a down counter 104, an OR circuit 105, a TP generator 106, and a FIFO 107. To the delay section 100 are input a TP signal and a clock signal, in addition to cell data. The TP signal indicates the head of data. It is here assumed that the TP signal TPi and the clock signal CLK are input, together with cell data a, b and c, for example, to the delay section 100, as shown in FIG. 7.

The FIFO 107 is a first-in, first-out memory, in which input data is written in response to the input-side TP signal TPi and from which the written data is read out in response to an output-side TP signal TPo, described later. The timing generator 101 generates pulses at predetermined intervals of time T1 based on the input-side clock signal CLK. The cell counter 102 is an up counter which counts the number of pulses of the input-side TP signal TPi and which is reset by a pulse output from the timing generator 101. In the example shown in FIG. 7, the count value of the cell counter 102 immediately before it is reset is "3".

The n-stage shift register 103 comprises n shift registers 103a to 103n and shifts the count value of the cell counter 102 held thereby immediately before resetting n times during the predetermined interval T1. The down counter 104 loads the output of the n-stage shift register 103 as a load value, and counts the load value down each time a pulse of the output-side TPo signal is input. The OR circuit 105 has inputs thereof supplied with respective digits of a binary count value from the down counter 104, and an output signal thereof is sent to the cell flow creating section 20 as a send request. In the example shown in FIG. 7, the output of the OR circuit 105 turns to "1" only while the count value of the down counter 104 is "3", "2" or "1".

On receiving the send request, the cell flow creating section 20 sends back a permit signal to permit data read from the FIFO 107, whereupon the TP generator 106 generates the output-side TP signal TPo by subjecting a read clock (READ CLK) supplied thereto from the cell flow creating section 20 to frequency division. The TP signal TPo is generated only for the duration of the permit signal, as shown in FIG. 7, and is output to the down counter 104, the FIFO 107, and the cell flow creating section 20.

When the FIFO 107 is fully occupied with written data because of arrears of data read, it outputs a FIFO full alarm to the cell flow creating section 20.

As a result of the delay process performed at the delay section 100, the predetermined time Td falls within a range of $nT1 < Td < (n+1)T1$.

Figure 8:
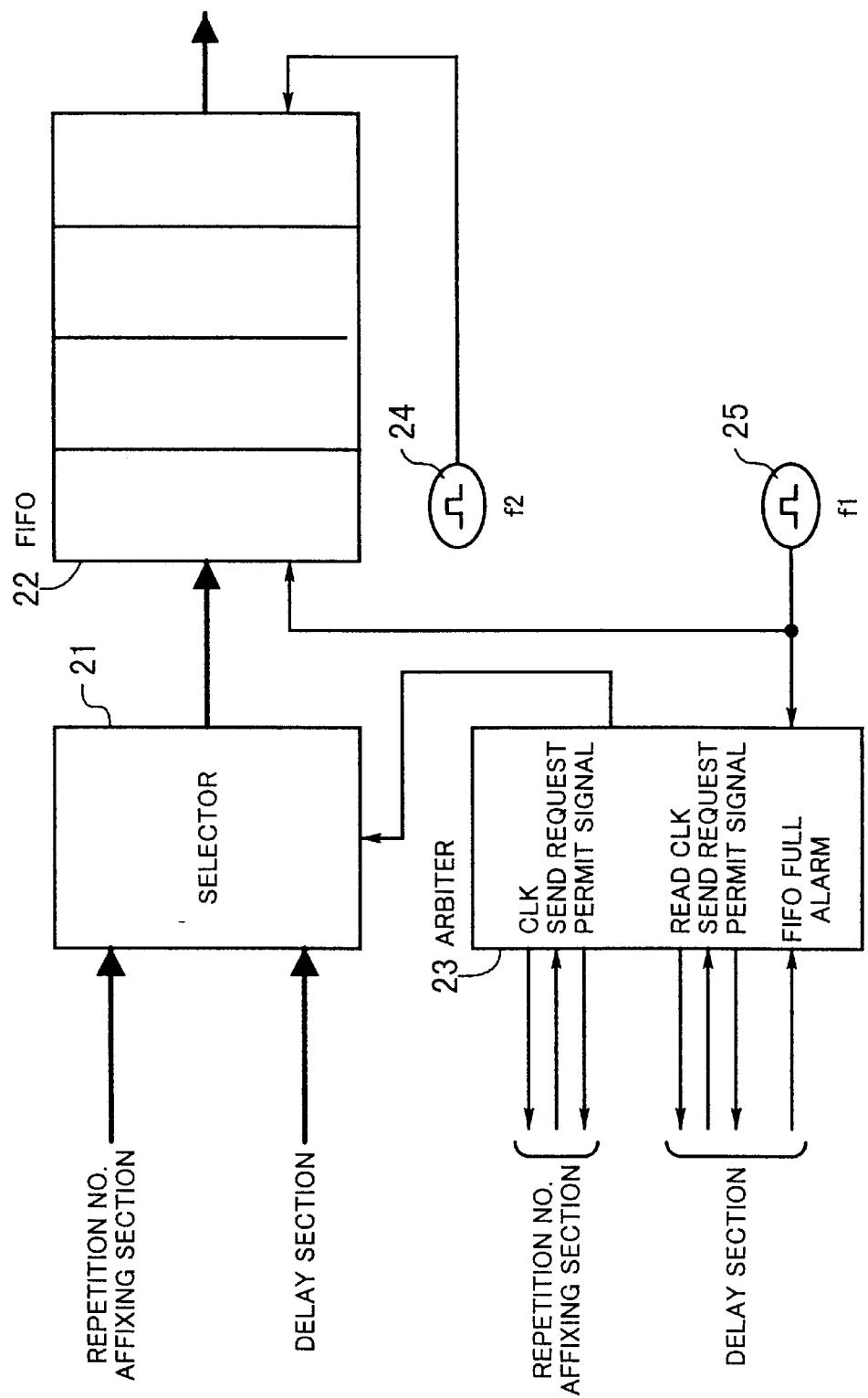
FIG. 8 is a block diagram showing the internal arrangement of a cell flow creating section.

FIG. 8 shows the internal arrangement of the cell flow creating section 20. The cell flow creating section 20 comprises a selector 21, a FIFO 22, an arbiter 23, a read clock 24, and a write clock 25. The selector 21 is supplied with an input cell from the repetition number affixing section 10 as well as with a delayed cell (output data) from the delay section 100. The selector 21 selects one of the input cell and the delayed cell in accordance with a selection signal supplied from the arbiter 23, and outputs the selected cell. The arbiter 23 generates the selection signal based on a send request supplied from the repetition number affixing section 10 and the send request and FIFO full alarm supplied from the delay section 100, and outputs the signal to the selector 21. The cell output from the selector 21 is written in the FIFO 22 in response to a clock signal from the write clock 25, and the written cells are successively read out in response to a clock signal from the read clock 24. The clock frequency f1 of the write clock 25 is set to a value smaller than the clock frequency f2 of the read clock 24, in order to prevent overflow of cells in the cell flow creating section 20.

Figure 9:
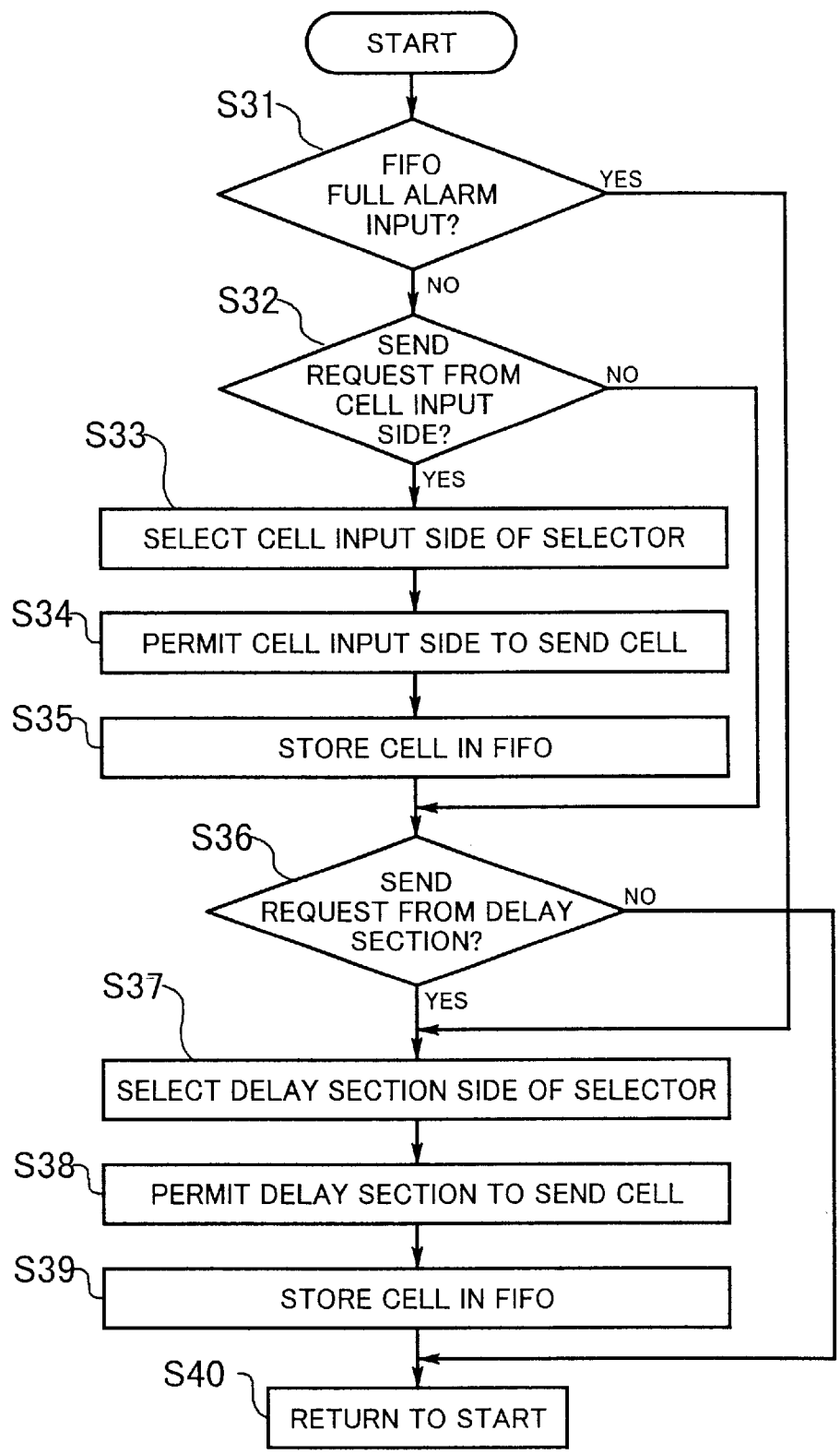
FIG. 9 is a flowchart illustrating the operation of the cell flow creating section.
Figure 10:
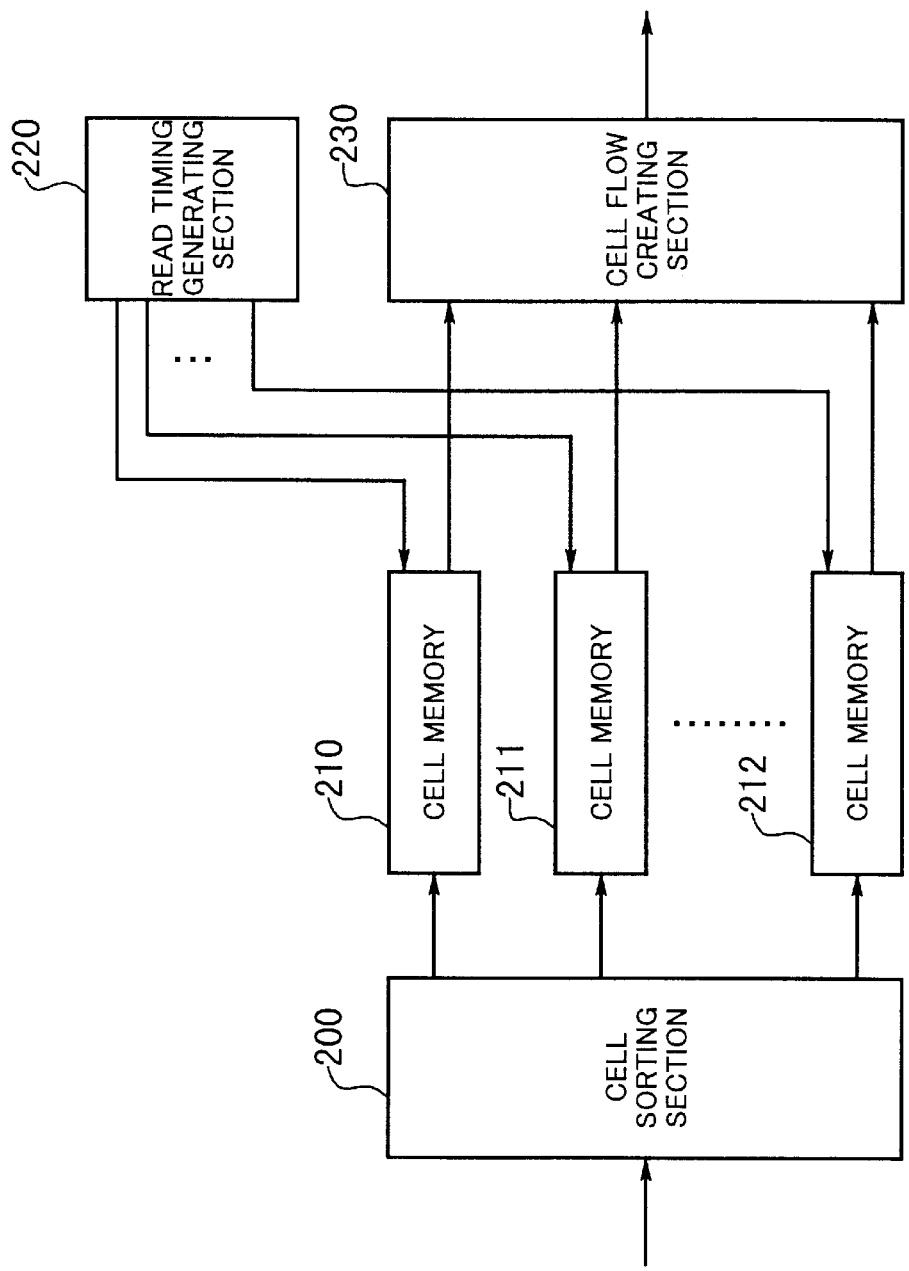
FIG. 10 is a block diagram showing the configuration of a conventional traffic shaping control device.

FIG. 9 is a flowchart illustrating the operation of the cell flow creating section 20. Referring to the flowchart, the process/operation of the cell flow creating section 20 will be described.

The arbiter 23 determines whether or not a FIFO full alarm has been input from the delay section 100, and if a FIFO full alarm has been input, the flow proceeds to Step S37 (S31) because data read from the FIFO 107 of the delay section 100 needs to be expedited. If no FIFO full alarm has been input, it is determined whether or not a send request has been input from the repetition number affixing section 10. If no such send request has been input, then no cell is input from the repetition number affixing section 10, and therefore, the flow proceeds to Step S36 (S32). If a send request has been input from the repetition number affixing section 10, a selection signal to select an input cell from the repetition number affixing section 10 is sent to the selector 21 (S33), thereby giving the input cell priority over a delayed cell. Also, the arbiter 23 sends a permit signal to the repetition number affixing section 10 to permit same to send the cell (S34). The FIFO 22 stores the cell supplied from the selector 21 (S35).

Subsequently, the arbiter 23 determines whether or not a send request has been input from the delay section 100 (S36). If such a send request has been input, a selection signal to select a delayed cell from the delay section 100 is sent to the selector 21 (S37). Also, the arbiter 23 sends a permit signal to the delay section 100 to permit same to send the cell (S38). The FIFO 22 stores the cell supplied from the selector 21 (S39).

The above sequence of operations is repeated (S40).

Although the traffic shaping device of the foregoing embodiment has a hardware-based configuration, it may alternatively be implemented by a data processor.

As described above, according to the present invention, the flow rate of cells of each of connections is checked with the use of the flow rate calculating means, and a cell exceeding the predetermined reference flow rate is circulated through the delay loop a number of times corresponding to the initial number of repetitions determined for each connection. Such a cell is therefore delayed so that the flow rate may eventually become lower than or equal to the predetermined reference flow rate. The cell flow rate is thereafter again checked by the flow rate calculating means, and the above operation is repeated until the flow rate is reduced to the predetermined reference flow rate or below.

It is, therefore, unnecessary to provide a cell memory for each of connections, thus permitting the hardware to be downscaled. Also, those cells with no problem of cell flow rate are not subjected to the delay process, and thus the present invention can eliminate a delay of cells that occurs in the conventional device due to a delay process performed on cells which need not be subjected to the delay process.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be resorted to, falling within the scope of the invention in the appended claims and their equivalents.

What is claimed is:

1. A traffic shaping control device used in an ATM communication network for keeping a time interval between adjacent ATM cells of each of connections at a prescribed value or more, comprising:

repetition number affixing means for affixing a repetition number of "0" to an input cell;

delay-controlled cell detecting means for determining based on a VPI/VCI value of the input cell or a delayed cell whether or not the cell concerned is a first type cell which, inclusive of another cell of an identical connection, is not currently present in a delay loop;

delay-passed cell detecting means for determining, based on the VPI/VCI value of the input cell or the delayed cell and the repetition number affixed thereto, whether the cell concerned is a second type cell which has passed through the delay loop with another cell of an identical connection currently present in the delay loop, or a third type cell which has not yet passed through the delay loop but with another cell of an identical connection currently present in the delay loop, and for outputting the third type cell with an initial number of repetitions set as the repetition number affixed thereto;

number-of-repetitions monitoring means for receiving the second type cell from said delay-passed cell detecting means, checking the repetition number affixed to the received cell to determine whether or not the cell has passed through the delay loop a number of times corresponding to the initial number of repetitions thereof, and for outputting the cell with the repetition number thereof decremented by "1" if the cell has not yet passed through the delay loop a number of times corresponding to the initial number of repetitions thereof;

flow rate calculating means for receiving the first type cell from said delay-controlled cell detecting means and a cell which, among second type cells, has passed through the delay loop a number of times corresponding to the initial number of repetitions thereof, from said number-of-repetitions monitoring means, calculating a flow rate of the received cell to determine whether or not a predetermined reference flow rate is exceeded by the calculated flow rate, and for outputting a cell of which the calculated flow rate is higher than the predetermined reference flow rate with the initial number of repetitions set as the repetition number affixed thereto;

repetition number deleting means for deleting the repetition number from a cell of which the calculated flow rate is judged to be not exceeding the predetermined reference flow rate by said flow rate calculating means; and delay means for subjecting the third type cell output from said delay-passed cell detecting means, the second type cell which is output from said number-of-repetitions monitoring means and of which the repetition number has been decremented, and the first or second type cell which is output from said flow rate calculating means and of which the repetition number has been decremented, to a delay process for a predetermined time and outputting the delayed cell.

2. The traffic shaping control device according to claim 1, wherein the initial number of repetitions is set beforehand with respect to each VPI/VCI value.

3. The traffic shaping control device according to claim 1, wherein the predetermined reference flow rate is set beforehand with respect to each VPI/VCI value.

4. The traffic shaping control device according to claim 1, further comprising flow rate-monitored cell detecting means arranged between said repetition number affixing means and said delay-controlled cell detecting means, for determining based on the VPI/VCI value of the input cell whether or not the input cell is a cell of which the flow rate is to be monitored, sending the cell to said delay-controlled cell detecting means if the flow rate of the cell is to be monitored, and sending the cell to said repetition number deleting means if the flow rate of the cell need not be monitored.

5. The traffic shaping control device according to claim 1, further comprising control memory means for storing a number of cells of an identical connection present in the delay loop, the initial number of repetitions and the predetermined reference flow rate in association with each of the VPI/VCI values, control memory access means arranged between said repetition number affixing means and said delay-controlled cell detecting means, for accessing said control memory means by means of the VPI/VCI value of the input cell or the delayed cell to read out information stored in said control memory means, and number-of-delayed cells control means for storing in said control memory means a number of cells of an identical connection present in the delay loop.

6. The traffic shaping control device according to claim 1, wherein said delay means includes a memory in which input data is written in response to an input-side TP signal and from which the written data is read out in response to an output-side TP signal, a timing generator for generating pulses at predetermined intervals of time based on an input-side clock signal, a cell counter for counting a number of pulses of the input-side TP signal, said cell counter being reset in response to a pulse output from said timing generator, an n-stage shift register for shifting a count value of said cell counter held thereby immediately before resetting n times during the predetermined time interval, a down counter for loading an output of said n-stage shift register as a load value and counting the load value down each time a pulse of the output-side TP signal is input thereto, an OR circuit for outputting a send request signal only when an output of said down counter indicates a value other than "0", and a TP generator for generating the output-side TP signal when a permit signal is sent back from a component which has received the send request signal output from said OR circuit.

7. The traffic shaping control device according to claim 1, further comprising cell flow creating means arranged between said repetition number affixing means and said delay-controlled cell detecting means, for creating a single cell flow from input cells and delayed cells.

8. The traffic shaping control device according to claim 7, wherein said cell flow creating means includes a selector for selecting one of an input cell and a delayed cell in accordance with a selection signal and outputting the selected cell, an arbiter for generating the selection signal based on a send request from a component from which the input cell is sent, and a send request signal and a memory full alarm from said delay means, and sending the selection signal to said selector, and a memory in which cells output from said selector are written and from which the written cells are successively read out.

* * * * *